US012559698B2

(12) United States Patent
Murphy et al.

(10) Patent No.: US 12,559,698 B2
(45) **Date of Patent: *Feb. 24, 2026**

(54) WAX COMPOSITIONS AND THE EFFECT OF METALS ON BURN RATES

(71) Applicant: CARGILL, INCORPORATED, Wayzata, MN (US)

(72) Inventors: Timothy Alan Murphy, Albertville, MN (US); James Thomas Groce, Crystal Lake, IL (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,308

(22) Filed: Jun. 20, 2024

(65) Prior Publication Data

US 2024/0336873 A1 Oct. 10, 2024

Related U.S. Application Data

(63) Continuation of application No. 17/214,250, filed on Mar. 26, 2021, now Pat. No. 12,043,819, which is a continuation of application No. 15/604,033, filed on May 24, 2017, now Pat. No. 11,008,532, which is a continuation of application No. 14/966,863, filed on Dec. 11, 2015, now abandoned, which is a continuation of application No. 14/179,194, filed on Feb. 12, 2014, now abandoned.

(60) Provisional application No. 61/765,753, filed on Feb. 17, 2013.

(51) Int. Cl.

| | |
|---|---|
| ***C11C 5/02*** | (2006.01) |
| ***C11C 5/00*** | (2006.01) |

(52) U.S. Cl.

CPC .............. *C11C 5/023* (2013.01); *C11C 5/002* (2013.01)

(58) Field of Classification Search

CPC ................................ C11C 5/002; C11C 5/023

See application file for complete search history.

(56) References Cited

U.S. PATENT DOCUMENTS

| | | | |
|---|---|---|---|
| 2,365,045 | A | 12/1944 | Borkowski |
| 2,602,807 | A | 7/1952 | Morris |
| 2,650,931 | A | 9/1953 | Dron |

(Continued)

FOREIGN PATENT DOCUMENTS

| | | | |
|---|---|---|---|
| GB | 2197337 | A | 12/1986 |
| JP | 2011252136 | A | 12/2011 |

OTHER PUBLICATIONS

F.J. Flider et al., Metals in Soybean Oil,3 pages, Mar. 1981, JAOCS (Year: 1981).*

(Continued)

*Primary Examiner* — Latosha Hines

(57) ABSTRACT

A wax composition is disclosed, comprising a hydrogenated natural oil with (i) at least about 50 wt % of a triacylglycerol component having a fatty acid composition from about 14 to about 25 wt % C16:0 fatty acid, about 45 to about 60 wt % C18:1 fatty acid and about 20 to about 30 wt % C18:0 fatty acid, (ii) a nickel content of less than 1 ppm, and (iii) a melt point of about 49° C. to about 57° C. The hydrogenated natural oil is filtered and/or bleached to obtain a nickel content of less than 0.5 ppm. A candle is also disclosed, comprising a wick and the above described wax.

20 Claims, 1 Drawing Sheet

(56) References Cited

U.S. PATENT DOCUMENTS

| | | | | |
|---|---|---|---|---|
| 2,654,766 | A | 10/1953 | Taussky | |
| 2,783,260 | A | 2/1957 | Merker | |
| 3,011,896 | A | 12/1961 | Fred | |
| 3,896,053 | A | 7/1975 | Broecker | |
| 4,314,915 | A | 2/1982 | Wiegers | |
| 4,411,829 | A | 10/1983 | Schulte-Elte | |
| 4,434,306 | A | 2/1984 | Kobayashi | |
| 4,614,625 | A | 9/1986 | Wilson | |
| 4,857,237 | A | 8/1989 | Kopp | |
| 6,284,007 | B1 | 9/2001 | Tao | |
| 6,503,285 | B1 * | 1/2003 | Murphy | C11C 5/002 44/275 |
| 6,599,334 | B1 | 7/2003 | Anderson | |
| 6,645,261 | B2 | 11/2003 | Murphy | |
| 6,770,104 | B2 | 8/2004 | Murphy | |
| 6,773,469 | B2 | 8/2004 | Murphy | |
| 6,797,020 | B2 | 9/2004 | Murphy | |
| 7,128,766 | B2 | 10/2006 | Murphy | |
| 7,192,457 | B2 | 3/2007 | Murphy | |
| 7,217,301 | B2 | 5/2007 | Murphy | |
| 7,410,513 | B2 | 8/2008 | Requejo | |
| 7,462,205 | B2 | 12/2008 | Murphy | |
| 7,588,607 | B1 | 9/2009 | Cap | |
| 7,637,968 | B2 | 12/2009 | Murphy | |
| 7,833,294 | B2 | 11/2010 | Murphy | |
| 8,021,443 | B2 | 9/2011 | Murphy | |
| 8,137,418 | B2 | 3/2012 | Tao | |
| 8,202,329 | B2 | 6/2012 | Murphy | |
| 8,870,565 | B2 | 10/2014 | Knight | |
| 11,008,532 | B2 | 5/2021 | Murphy | |
| 2003/0057599 | A1 | 3/2003 | Murphy | |
| 2003/0061760 | A1 | 4/2003 | Tao et al. | |
| 2006/0236593 | A1 | 10/2006 | Cap | |
| 2007/0039237 | A1 | 2/2007 | Murphy | |
| 2007/0048684 | A1 | 3/2007 | Cole | |
| 2009/0217568 | A1 | 9/2009 | Murphy | |
| 2010/0132250 | A1 | 6/2010 | Uptain | |
| 2011/0219667 | A1 | 9/2011 | Dimaio | |
| 2017/0253832 | A1 | 9/2017 | Murphy | |

OTHER PUBLICATIONS

"Alternative Natural Waxes Shine from Petro Woes", The World of Candles, Waxes and Other Products, (2008), 1 pg.
"U.S. Appl. No. 14/966,863, Advisory Action mailed Apr. 28, 2017", 3 pgs.
"U.S. Appl. No. 14/966,863, Advisory Action Response Filed May 24, 2017 to Advisory Action mailed Apr. 28, 2017", 11 pgs.
"U.S. Appl. No. 14/966,863, Examiner Interview Summary mailed Jan. 17, 2019", 3 pgs.
"U.S. Appl. No. 14/966,863, Final Office Action mailed Feb. 2, 2017", 13 pgs.
"U.S. Appl. No. 14/966,863, Final Office Action mailed Oct. 6, 2017", 29 pgs.
"U.S. Appl. No. 14/966,863, Final Office Action mailed Nov. 30, 2018", 17 pgs.
"U.S. Appl. No. 14/966,863, Non Final Office Action mailed May 17, 2018", 14 pgs.
"U.S. Appl. No. 14/966,863, Non Final Office Action mailed Jun. 12, 2017", 18 pgs.
"U.S. Appl. No. 14/966,863, Response filed May 14, 2017 to Advisory Action mailed Apr. 28, 2017", 11 pgs.
"U.S. Appl. No. 14/966,863, Response filed Jul. 25, 2018 to Non Final Office Action mailed May 17, 2018", 16 pgs.
"U.S. Appl. No. 14/966,863, Response filed Sep. 6, 2017 to Non Final Office Action mailed Jun. 12, 2017", 16 pgs.
"U.S. Appl. No. 14/966,863, Third-Party Submission filed Sep. 30, 2016", 4 pgs.
"U.S. Appl. No. 15/604,033, Advisory Action mailed Feb. 12, 2018", 3 pgs.
"U.S. Appl. No. 15/604,033, Amendment under 1.116 and 41.33(a) filed Feb. 6, 2018", 7 pgs.
"U.S. Appl. No. 15/604,033, Appeal Brief filed Feb. 7, 2018", 23 pgs.
"U.S. Appl. No. 15/604,033, Appeal Brief filed Apr. 9, 2020", 37 pgs.
"U.S. Appl. No. 15/604,033, Appeal Decision mailed Dec. 18, 2020", 9 pgs.
"U.S. Appl. No. 15/604,033, Applicant Interview Summary filed Jan. 30, 2020", 1 pg.
"U.S. Appl. No. 15/604,033, Corrected Notice of Allowability mailed Apr. 15, 2021 ", 6 pgs.
"U.S. Appl. No. 15/604,033, Decision on Pre-Appeal Brief Request mailed Dec. 26, 2017", 2 pgd.
"U.S. Appl. No. 15/604,033, Examiner Interview Summary filed Apr. 6, 2021 ", 1 pg.
"U.S. Appl. No. 15/604,033, Examiner Interview Summary mailed Jan. 17, 2019", 3 pgs.
"U.S. Appl. No. 15/604,033, Examiner Interview Summary mailed Jan. 17, 2020", 4 pgs.
U.S. Appl. No. 17/214,228, Non Final Office Action mailed Apr. 28, 2022, 8 pgs.
U.S. Appl. No. 17/214,228, Notice of Allowance mailed Sep. 23, 2022, 8 pgs.
Hughes, J P, "Hydrogenation of Fatty Oils", Journal of the American Oil Chemists' Society, pp. 506-515, (Nov. 1953), 7 pgs.
Kowalewska, Zofia, et al., "Application of Liquid-Liquid Extraction and Adsorption on Activated Carbon to the Determination of Different Forms of Metals Present in Edible Oils", Chem. Anal. (Warsaw), 50, pp. 1007-1019, (2005), 16 pgs.
Nickel", Chapter 6.10 of Air Quality Guidelines for Europe, World Health Organization Regional Publications, European Series, No. 91, pp. 162-165 (Jan. 1, 2000), 7 pgs."
O'Brien, R D, "Chapter 2.7 Pre-Bleaching", Fats and Oils: Formulating and Processing for Applications (3d. ed.), CRC Press, (2009), 100-110.
O'Brien, R D, "Chapter 2.8 Hydrogenation", Fats and Oils: Formulating and Processing for Applications (3d. ed.), pp. 110-121, CRC Press, (2009), 13 pgs.
Shahidi, Fereidoon, "Chapter 1 Chemistry of Fatty Acids", Bailey's Industrial Oil and Fat Products, vol. 1, Edible Oil and Fat Products: Chemistry, Properties, and Health Effects, Sixth Edition. pp. 1-43, (2005), 46 pgs.
"U.S. Appl. No. 15/604,033, Examiner's Answer mailed Aug. 5, 2020", 34 pgs.
"U.S. Appl. No. 15/604,033, Final Office Action mailed Oct. 6, 2017", 25 pgs.
"U.S. Appl. No. 15/604,033, Final Office Action mailed Oct. 11, 2019", 27 pgs.
"U.S. Appl. No. 15/604,033, Final Office Action mailed Nov. 30, 2018", 20 pgs.
"U.S. Appl. No. 15/604,033, Non Final Office Action mailed Apr. 4, 2019", 18 pgs.
"U.S. Appl. No. 15/604,033, Non Final Office Action mailed May 17, 2018", 17 pgs.
"U.S. Appl. No. 15/604,033, Non Final Office Action mailed Jun. 14, 2017", 14 pgs.
"U.S. Appl. No. 15/604,033, Notice of Allowance mailed Mar. 11, 2021", 9 pgs.
"U.S. Appl. No. 15/604,033, Pre-Appeal Brief Request filed Feb. 10, 2020", 5 pgs.
"U.S. Appl. No. 15/604,033, Pre-Appeal Brief Request filed Dec. 7, 2017", 5 pgs.
"U.S. Appl. No. 15/604,033, Preliminary Amendment filed May 24, 2017", 6 pgs.
"U.S. Appl. No. 15/604,033, Reply Brief filed Sep. 14, 2020", 9 pgs.
"U.S. Appl. No. 15/604,033, Response filed Feb. 28, 2019 to Final Office Action Examiner mailed Nov. 30, 2018", 18 pgs.
"U.S. Appl. No. 15/604,033, Response filed Jul. 3, 2019 to Non Final Office Action mailed Apr. 4, 2019", 26 pgs.
"U.S. Appl. No. 15/604,033, Response filed Jul. 25, 2018 to Non Final Office Action mailed May 17, 2018", 15 pgs.
"U.S. Appl. No. 15/604,033, Response filed Sep. 6, 2017 to Non Final Office Action mailed Jun. 14, 2017", 13 pgs.

(56) References Cited

OTHER PUBLICATIONS

"ASTM F2417-11, Standard Specification for Fire Safety for Candles" [Online] [Accessed Jul. 3, 2019] Retrieved from Internet: <URL: https://www.astm.org/DATABASE.CART/HISTORICAL/F2417-11.htm>, 3pgs.
"Candle Burning Study", GAI Engineers, (Sep. 15, 2011), 29 pgs.
"Grubbs Catalyst® C827", Sigman-Aldrich, Inc., [Online]. [Accessed Jul. 3, 2019] Retrieved from Internet: <URL: https://www.sigmaaldrich.com/catalog/product/aldrich/682365?lang=en&regin=US>, 3 pgs.
"History of Industrial Uses of Soybeans (660 CE-2017)", Soyinfo Center, (2017), p. 1752.
"International Application Serial No. PCT/US2014/016183, International Search Report & Written Opinion mailed May 12, 2014", 9 pgs.
"Lead, nickel and allergenic scents in candles to be restricted", BFR Opinion No. 004/2014, [Online] Retrieved from the internet: <www.brf.bund.de> (Year: 2013), (Nov. 11, 2013), 1 pg.
"Melting-point determination of fat products", (Abstract), Journal of the American Oil Chemists' Society, (1983), 15-18, (1983), 1 pg.
"Mexican Application Serial No. MX20150009622, Office Action mailed Jan. 23, 2019", W/ English Translation, 13 pgs.
"Standard Test Method for Drop Melting Point of Petroleum Wax Including Petrolatum", American Society for Testing and Materials. Designation: D 127-87 (Reapproved 1999), Designation 133/79 (87), (1999), 2 pgs.
"The New 2018 AAK wax still useless" (Oct. 10, 2018) Retrieved from the Internet: <URL: https:www.craftserver.com/topic/113328-new-2018-aak-wax-still-useless/>, 11 pgs.
"Total Diet Study Statistics on Element Results", U.S. Food and Drug Administration, Dec. 11, 2007, (Dec. 11, 2007), 129-141.
"Why do my candles "tunnel" and can I fix them?" (Feb. 10, 2012). U.S. Candle Company Blog, 3 pgs, Retrieve from the Internet: <URL: https://uscandleco.wordpress.com/2012/02/10/why-do-my-candles-tunnel-and-can-i-fix-them/#content>.
BFR Opinion No. 004/2014. www.bfr.bund.de Nov. 11, 2013 (Year: 2013).
Brooke, "How many have experienced bad wax batches" (Aug. 11, 2005) Vegetable Way & Beeswax Candle Making, 7pgs, Retrieved from Internet: <URL: https://www.craftserver.com/topic/1749-how-many-have-experienced-bad-wax-batches/>.
International Search Report and Written Opinion of the International Searching Authority issued in PCT Patent Application No. PCT/US2014/016183, mailed May 12, 2014, 10 pages.
Derudi M. et al., "Emissions of air pollutants from scented candles burning in a test chamber", Atmospheric Environment, 2012, vol. 55, 257-26.
Gary R. and Jerry W. King, eds. Hydrogenation of Fats and Oils: Theory and Practice, p. 142 (2nd ed., Urbana, IL: AOCS Books, 2011).
J. M. Deman et al., "Melting-point determination of fat products", Journal of the Americal Oil Chemists' Society, 60(1), 15-18, (1983), (Abstract Only).
Jarboe, Darren, et al., "A example of commercializing biobased coatings and binders", Food Science and Human Nutrition Presentations, Posters and Proceedings, (2014), 6 pgs.
Nash, A M, et al., "Determination of ultratrace metals in hydrogenated oils and fats", Journal of the American Oil Chemists' Society. 60 (4), (1983), 811-814.
O'Brien, Richard D., Fats and Oils: Formulating and Processing for Applications, pp. 542-543 (3rd Ed., Boca Raton, FL: CRC Press, 2009).
O'Brien, Richard D., Fats and Oils: Formulating and Processing for Applications, pp. 144-145 (3rd Ed., Boca Raton, FL: CRC Press, 2009).
Patterson, H B, "Hydrogen Fats and Oils: Theory and Practice", (2009), 5 pgs.
Rezaei, et al., "Hydrogenated Vegetable Oils as Candle Wax", Journal of the American Oil Chemists' Society, 12, (2002), 1241-1247.
Rezaei, K. et al. "Hydrogenated Vegetable Oils as Candle Wax", J Amer Oil Chem Soc, vol. 79, pp. 1241-1247 (Dec. 2002).
Rezaei, K., et al. "Combustion Characteristics of Candles Made from Hydrogenated Soybean Oil", J Amer Oil Chem Soc. vol. 79, pp. 803-808 (Aug. 2002).
Rezaei, Karamatollah, et al., "Combustion Characteristics of Candles Made from Hydrogenated Soybean Oil", J. Amer. Oil. Chem. Soc., vol. 79, (Aug. 2002), 803-808.
Rich, Bleaching Clay, 16 pages, 1949, Industrial Minerals and Rocks, 2nd Edition.
Strugglebrother, "The New 2018 AAK wax still useless", CraftServer—The Community for all Things Scented, [Online]. Retrieved from the Internet: <URL: https://www.craflserver.com/topic/113328-new-2018-aak-wax-still-useless/>, (Oct. 10, 2018), 11 pgs.
Taylor, Dennis, "Absorptive Purification", Proceedings of the World Conference on Oilseed Technology and Utilization, The American Oil Chemists Society, (1993), 161-163.
Ullmann, Fritz, Wolfgang Gerhartz, Y S. Yamamoto, F T. Campbell, Rudolf Pfefferkorn, James F. Rounsaville, and Fritz Ullmann. Ullmann's Encyclopedia of Industrial Chemistry, p. 207 (5th Ed, New York, NY: VCH Publishers, 1985).
Ullmann, Fritz, Wolfgang Gerhartz, Y S. Yamamoto, F T. Campbell, Rudolf Pfefferkorn, James F. Rounsaville, and Fritz Ullmann. Ullmann's Encyclopedia of Industrial Chemistry, pp. 208-209 (5th Ed, Weinheim, Federal Republic of Germany: VCH, 1985).

* cited by examiner

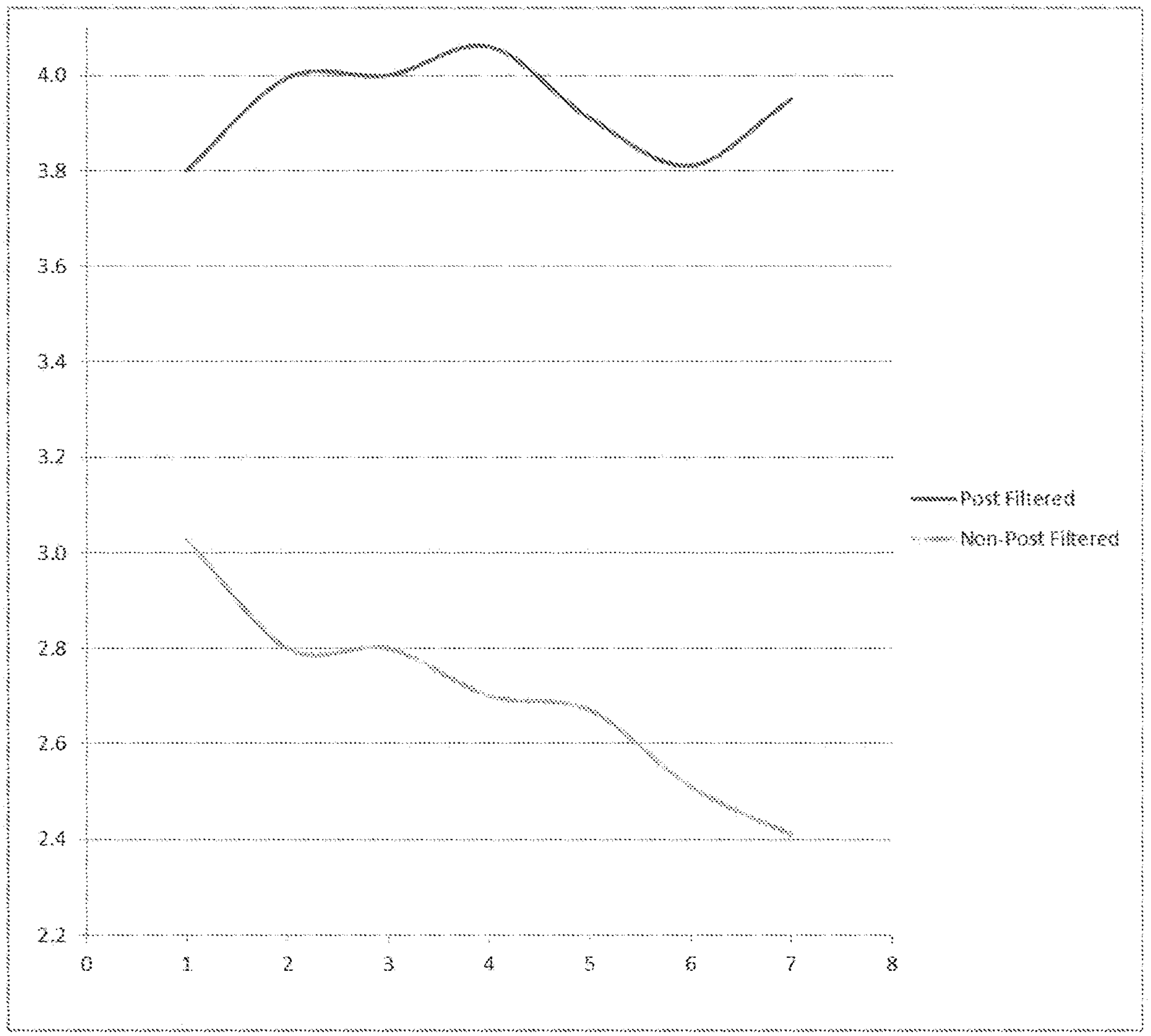
4.0
3.8
3.6
3.4
3.2
3.0
2.8
2.6
2.4
2.2
0
1
2
3
4
5
6
7
8
Post Filtered
Non-Post Filtered

WAX COMPOSITIONS AND THE EFFECT OF METALS ON BURN RATES

CROSS-REFERENCE TO RELATED APPLICATIONS

This application is a Continuation application of U.S. application Ser. No. 17/214,250, filed Mar. 26, 2021, which is a Continuation application of U.S. Pat. No. 11,008,532, issued May 18, 2021, which is a Continuation application of U.S. application Ser. No. 14/966,863, filed Dec. 11, 2025, which is a Continuation application of U.S. application Ser. No. 14/179,194, filed Feb. 12, 2014, which claims the benefit of U.S. Provisional Application No. 61/765,753, filed Feb. 17, 2013, each of which is incorporated by reference herein in its entirety.

FIELD OF THE INVENTION

This application relates to natural oil based wax compositions, including candle compositions and the effect of metals on burn rates of such wax and candle compositions.

BACKGROUND OF THE INVENTION

For a long time, beeswax has been in common usage as a natural wax for candles. Over one hundred years ago, paraffin came into existence, in parallel with the development of the petroleum refining industry. Paraffin is produced from the residue leftover from refining gasoline and motor oils. Paraffin was introduced as a bountiful and low cost alternative to beeswax, which had become more and more costly and in more and more scarce supply.

Today, paraffin is the primary industrial wax used to produce candles and other wax-based products. Conventional candles produced from a paraffin wax material typically emit a smoke and can produce a bad smell when burning. In addition, a small amount of particles ("particulates") can be produced when the candle burns. These particles may affect the health of a human when breathed in. A candle that has a reduced amount of paraffin would be preferable.

Accordingly, it would be advantageous to have other materials that can be used to form clean burning base wax for forming candles. If possible, such materials would preferably be biodegradable and be derived from renewable raw materials, such as natural oil based materials. The candle base waxes should preferably have physical characteristics, in terms of melting point, hardness and/or malleability, that permit the material to be readily formed into candles having a pleasing appearance and/or feel to the touch, as well as having desirable olfactory properties.

Such natural oil based candles may be derived from a hydrogenated natural oil. Hydrogenation is the process whereby the poly- and/or monounsaturated natural oils are saturated and become solidified in order to increase the viscosity. This is done by reaction of hydrogen with the natural oil at elevated temperature (140° C.-225° C.) in the presence of a transition metal catalyst, typically a nickel catalyst. The presence of excess nickel in a hydrogenated natural oil can have an effect on the burn rate of a candle by causing wick clogging, irregular flames and/or flame heights, poor fragrance interactions, or combinations of these issues. Thus, there is a need to reduce the amount of nickel present in such waxes to improve the burn rate of such candles.

SUMMARY OF THE INVENTION

In one aspect of the invention, a wax composition is disclosed. The wax composition comprises a hydrogenated natural comprising (i) at least about 50 wt % of a triacylglycerol component having a fatty acid composition from about 14 to about 25 wt % C16:0 fatty acid, about 45 to about 60 wt % C18:1 fatty acid and about 20 to about 30 wt % C18:0 fatty acid, (ii) a nickel content of less than 1 ppm, and (iii) a melt point of about 49° C. to about 57° C. The hydrogenated natural oil of the wax composition is filtered and/or bleached to obtain a transition metal content of less than 0.5 ppm.

In another aspect of the invention, a candle composition is disclosed. The candle comprises a wick and a wax, wherein the wax comprises a hydrogenated natural oil comprising (i) at least about 50 wt % of a triacylglycerol component having a fatty acid composition from about 14 to about 25 wt % C16:0 fatty acid, about 45 to about 60 wt % C18:1 fatty acid and about 20 to about 30 wt % C18:0 fatty acid, (ii) a nickel content of less than 1 ppm, and (iii) a melt point of about 49° C. to about 57° C. The hydrogenated natural oil of the candle composition is filtered and/or bleached to obtain a transition metal content of less than 0.5 ppm.

BRIEF DESCRIPTION OF THE DRAWINGS

FIG. 1. depicts several cycles of burn rates of a post-filtered and non-post filtered natural oil based wax composition.

DETAILED DESCRIPTION OF THE INVENTION

The present application relates to natural oil based wax compositions, including candle compositions and the effect of metal on burn rates of the wax and candle compositions.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "natural oil" may refer to oil derived from plants or animal sources. The term "natural oil" includes natural oil derivatives, unless otherwise indicated, Examples of natural oils include, but are not limited to, vegetable oils, algae oils, animal fats, tall oils, derivatives of these oils, combinations of any of these oils, and the like. Representative non-limiting examples of vegetable oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain embodiments, the natural oil may be refined, bleached, and/or deodorized. In some embodiments, the natural oil may be partially or fully hydrogenated. In some embodiments, the natural oil is present individually or as mixtures thereof.

As used herein, the term "natural oil derivatives" may refer to the compounds or mixture of compounds derived from the natural oil using any one or combination of methods known in the art. Such methods include saponification, transesterification, esterification, interesterification, hydrogenation (partial or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil.

Wax Compositions

In some embodiments, the natural oil based wax compositions of the present invention have a high triacylglycerol content, wherein a majority of the wax, at least about 50 wt %, preferably at least about 75 wt %, and most preferably at least about 90 wt %, is a triacylglycerol component.

The physical properties of a triacylglycerol are primarily determined by (i) the chain length of the fatty acyl chains, (ii) the amount and type (cis or trans) of unsaturation present in the fatty acyl chains, and (iii) the distribution of the different fatty acyl chains among the triacylglycerols that make up the natural oil. Those natural oils with a high proportion of saturated fatty acids are typically solids at room temperature while triacylglycerols in which unsaturated fatty acyl chains predominate tend to be liquid. Thus, hydrogenation of a triacylglycerol stock tends to reduce the degree of unsaturation and increase the solid fat content and can be used to convert a liquid oil into a semisolid or solid fat. Hydrogenation, if incomplete, also tends to result in the isomerization of some of the double bonds in the fatty acyl chains from a cis to a trans configuration. By altering the distribution of fatty acyl chains in the triacylglycerol moieties of a natural oil, e.g., by blending together materials with different fatty acid profiles, changes in the melting, crystallization and fluidity characteristics of a triacylglycerol stock can be achieved. As used herein, the terms "triacylglycerol stock" and "triacylglycerol component" are used interchangeably to refer to materials that are made up entirely of one or more triacylglycerol compounds. Commonly, the triacylglycerol stock or triacylglycerol component is a complex mixture of triacylglycerol compounds, which very often are derivatives of C16 and/or C18 fatty acids. Although the triacylglycerol stock can be used for many applications, the triacylglycerol stock is well suited for use as a candle wax, particularly for container candles.

The triacylglycerol stock, whether altered or not, is generally derived from various natural oil sources. Any given triacylglycerol molecule includes glycerol esterified with three carboxylic acid molecules. Thus, each triacylglycerol includes three fatty acid residues. In general, natural oils comprise a mixture of triacylglycerols which is characteristic of the specific source, The mixture of fatty acids isolated from complete hydrolysis of the triacylglycerols in a specific source is referred to herein as a "fatty acid composition" of the triacylglycerols. By the term "fatty acid composition," reference is made to the relative amounts of the identifiable fatty acid residues in the various triacylglycerols. The distribution of specific identifiable fatty acids is characterized herein by the amounts of the individual fatty acids as a weight percent of the total mixture of fatty acids obtained from hydrolysis of the particular mixture of triacylglycerols. The distribution of fatty acids in the triacylglycerols in a particular natural oil may be readily determined by methods known to those skilled in the art, such as by hydrolysis, subsequent derivatization to create natural oil derivatives (e.g., to form a mixture of methyl esters) via conventional analytical techniques such as gas chromatography.

The total mixture of fatty acids in the present wax composition which is isolated after complete hydrolysis of any esters in a sample are referred herein to as the "fatty acid profile" of that sample. Thus, the "fatty acid profile" of a sample includes not only the fatty acids produced by the hydrolysis of the triacylglycerols and/or other fatty acid esters but also any free fatty acids present in the sample. In many instances, the present wax is substantially free of any free fatty acid, e.g., the wax has a free fatty acid content of no more than about 0.5 wt. %. As noted above, the distribution of fatty acids in a particular mixture may be readily determined by methods known to those skilled in the art, e.g., via gas chromatography or conversion to a mixture of fatty acid methyl esters followed by analysis by gas chromatography.

Palmitic acid (16:0) and stearic acid (18:0) are saturated fatty acids and triacylglycerol acyl chains formed by the esterification of either of these acids do not contain any carbon-carbon double bonds. The nomenclature in the above parentheses refers to the number of total carbon atoms in a straight chain fatty acid followed by the number of carbon-carbon double bonds in the chain. Many fatty acids such as oleic acid, linoleic acid and linolenic acid are unsaturated, i.e., contain one or more carbon-carbon double bonds. Oleic acid is an 18 carbon straight chain fatty acid with a single double bond (i.e., an 18:1 fatty acid), linoleic acid is an 18 carbon fatty acid with two double bonds or points of unsaturation (i.e., an 18:2 fatty acid), and linolenic is an 18 carbon fatty acid with three double bonds (i.e., an 18:3 fatty acid).

The fatty acid composition of the triacylglycerol stock derived from a natural oil, which makes up the significant portion of the present wax composition, generally is made up predominantly of fatty acids having 1.6 or 18 carbon atoms. The amount of shorter chain fatty acids, i.e., fatty acids having 14 carbon atoms or less in the fatty acid profile of the triacylglycerols is generally very low, e.g., no more than about 3 wt. % and, more typically, no more than about 1 wt. %. The triacylglycerol stock generally includes a moderate amount of saturated 16 carbon fatty acid, e.g., at least about 14 wt. % and typically no more than about 25 wt. %, preferably from about 15 wt. % to 20 wt. % C16:0 palmitic acid. As mentioned above, the fatty acid composition of the triacylglycerols commonly includes a significant amount of C18 fatty acid(s). In order to achieve a desirable container candle characteristics, the fatty acids typically include a mixture of saturated 18 carbon fatty acid(s), e.g., about 20 wt. % to 30 wt. % and, more suitably, about 23 wt. % to 27 wt. % C18:0 stearic acid, and 18 carbon unsaturated fatty acids, e.g., about 45 wt. % to 60 wt. % and more typically about 50 wt. % to 57 wt. % C18:1 fatty acid(s), such as oleic acid. The unsaturated fatty acids are predominantly monounsaturated fatty acid(s).

The fatty acid composition of the triacylglycerol stock is typically selected to provide a triacylglycerol-based material with a melting point of about 49° C. to 57° C. When the present wax is to be used to produce a container candle, the wax suitably is selected to have a melting point of about 51°

C. to 55° C. The desired melting point can be achieved by altering several different parameters. The primary factors which influence the solid fat and melting point characteristics of a triacylglycerol are the chain length of the fatty acyl chains, the amount and type of unsaturation present in the fatty acyl chains, and the distribution of the different fatty acyl chains within individual triacylglycerol molecules. The present triacylglycerol-based materials are formed from triacylglycerols with fatty acid profiles dominated by C18 fatty acids (fatty acids with 18 carbon atoms). Triacylglycerols with extremely large amounts of saturated 18 carbon fatty acid (also referred to as 18:0 fatty acid(s), e.g., stearic acid) tend to have melting points which would be too high for the producing the present candles since such materials may be prone to brittleness, cracking and may tend to pull away from the container into which the wax is poured. The melting point of such triacylglycerols can be lowered by blending in triacylglycerols with shorter chain fatty acids and/or unsaturated fatty acids. Since the present triacylglycerol-based materials have fatty acid profiles in which C18 fatty acids predominate, the desired the melting point and/or solid fat index is typically achieved by altering the amount of unsaturated C18 fatty acids present (predominantly 18:1 fatty acid(s)).

Additionally, wax compositions which have fatty acid compositions including a significant amount of saturated C16 fatty acid on the one hand, or lesser amounts of saturated C16 fatty acid on the other hand, can tend to exhibit undesirable physical characteristics, and specifically are visually unpleasing due to the inconsistent crystallization of the wax upon cooling (such as occurs in recooling of melted candle wax). Consistent characteristics and pleasing aesthetics in the recooled wax can be achieved by controlling the level of saturated C16 fatty acid present in the fatty acid composition of the triacylglycerol based materials used to produce the wax. In particular, it has been found that triacylglycerol-based waxes that have fatty acid compositions which include about 14 to 25 wt. % palmitic acid (16:0 fatty acid) generally tend to exhibit a much more consistent appearance upon resolidification after melting than do similar wax compositions derived entirely from soybean oil (soybean oil has a fatty acid composition which includes about 10 to 11 wt. % palmitic acid).

To enhance its physical properties, such as its capability of being blended with natural color additives to provide an even solid color distribution, in some instances the present wax may include a glycerol fatty acid monoester. Monoesters which are produced by partial esterification of a glycerol with a mixture of fatty acids derived from hydrolysis of a triacylglycerol stock are suitable for use in the present wax compositions. Examples include monoglycerol esters of a mixture of fatty acids derived from hydrolysis of a partially or fully hydrogenated natural oil, e.g., fatty acids derived from hydrolysis of fully hydrogenated soybean oil. Where a glycerol fatty acid monoester is included in the present wax composition, it is generally present as a relatively minor amount of the total composition, e.g., the glycerol fatty acid monoester may constitute about 1 to 5 wt. % of the wax composition.

In some instances it may be advantageous to minimize the amount of free fatty acid(s) in the present wax. Since carboxylic acids can be somewhat corrosive, the presence of fatty acid(s) in a candle wax can increase its irritancy to skin. The presence of free fatty acid can also influence the olfactory properties of candles produced from the wax. The present triacylglycerol-based wax can be used to produce candles and, in particular, container candles, without the inclusion of free fatty acid(s) in the wax. Such embodiments of the present triacylglycerol-based wax suitably have a free fatty acid content ("FFA") of less than about 1.0 wt. % and, preferably no more than about 0.5 wt. %.

The wax composition(s) described herein can be used to provide candles from triacylglycerol-based materials having a melting point and/or solid fat content which imparts desirable molding and/or burning characteristics. The solid fat content, as determined at one or more temperatures, can be used as a measure of the fluidity properties of a triacylglycerol stock. The melting characteristics of the triacylglycerol-based material may be controlled based on its solid fat index. The solid fat index is a measurement of the solid content of a triacylglycerol material as a function of temperature, generally determined at number of temperatures over a range from 10° C. (50° F.) to 40° C. (104° F.). Solid fat content ("SFC") can be determined by Differential Scanning calorimetry ("DSC") using the methods well known to those skilled in the art. Fats with lower solid fat contents have a lower viscosity, i.e., are more fluid, than their counterparts with high solid fat contents.

The melting characteristics of the triacylglycerol-based material may be controlled based on its solid fat index to provide a material with desirable properties for forming a candle. Although the solid fat index is generally determined by measurement of the solid content of a triacylglycerol material as a function over a range of 5 to 6 temperatures, for simplicity triacylglycerol-based materials are often characterized in terms of their solid fat contents at 10° C. ("SFC-10") and/or 40° C. ("SFC-40").

One measure for characterizing the average number of double bonds present in a triacylglycerol stock which includes triacylglycerol molecules with unsaturated fatty acid residues is its Iodine Value. The Iodine Value of a triacylglycerol or mixture of triacylglycerols is determined by the Wijs method (A.O.C.S. Cd 1-25) incorporated herein by reference. For example, soybean oil typically has an Iodine Value of about 125 to about 135 and a melting point of about 0° C. to about −10° C. Hydrogenation of soybean oil to reduce its Iodine Value to about 90 increases the melting point of the material as evidenced by the increase in its melting point to about 10° C. to 20° C. Further hydrogenation can produce a material which is a solid at room temperature and may have a melting point of 65° C. or even higher. Typically, the present candles are formed from natural oil-based waxes which include a triacylglycerol stock having an Iodine Value of about 45 to about 60, and more suitably about 45 to about 55, and preferably about 50 to 55. The present waxes (including the triacylglycerol-based material and other components blended therewith) commonly have an Iodine Value of about 40-55 and, more suitably, about 45 to 55.

Natural oil feedstocks used to produce the triacylglycerol component in the present candle stock material have generally been neutralized and bleached. The triacylglycerol stock may have been processed in other ways prior to use, e.g., via fractionation, hydrogenation, refining, and/or deodorizing. Preferably, the feedstock is a refined, bleached triacylglycerol stock. The processed feedstock material may be blended with one or more other triacylglycerol feedstocks to produce a material having a desired distribution of fatty acids, in terms of carbon chain length and degree of unsaturation. Typically, the triacylglycerol feedstock material is hydrogenated to reduce the overall degree of unsaturation in the material and provide a triacylglycerol material having physical properties which are desirable for a candle-making base material.

Hydrogenation may be conducted according to any known method for hydrogenating double bond-containing compounds such as natural oils. Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated. The material is then heated to a desired temperature. Typically, the temperature ranges from about 50° C. to 350° C., for example, about 100° C. to 300° C. or about 150° C. to 250° C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated. When the material to be hydrogenated reaches the desired temperature, the slurry of hydrogenation catalyst is added to the reaction vessel. Hydrogen gas is then pumped into the reaction vessel to achieve a desired pressure of $H_2$gas. Typically, the $H_2$gas pressure ranges from about 15 to 3000 psig, for example, about 15 psig to 90 psig. As the gas pressure increases, more specialized high-pressure processing equipment may be required. Under these conditions the hydrogenation reaction begins and the temperature is allowed to increase to the desired hydrogenation temperature (e.g., about 120° C. to 200° C.) where it is maintained by cooling the reaction mass, for example, with cooling coils. When the desired degree of hydrogenation is reached, the reaction mass is cooled to the desired filtration temperature.

In some embodiments, the natural oil is hydrogenated in the presence of a metal catalyst, typically a transition metal catalyst, for example, nickel, copper, palladium, platinum, molybdenum, iron, ruthenium, osmium, rhodium, or iridium catalyst. Combinations of metals may also be used. Useful catalyst may be heterogeneous or homogeneous. The amount of hydrogenation catalysts is typically selected in view of a number of factors including, for example, the type of hydrogenation catalyst used, the amount of used, the degree of unsaturation in the material to be hydrogenated, the desired rate of hydrogenation, the desired degree of hydrogenation (e.g., as measure by iodine value (IV)), the purity of the reagent, and the $H_2$ gas pressure.

In some embodiments, the hydrogenation catalyst comprises nickel that has been chemically reduced with hydrogen to an active state (i.e., reduced nickel) provided on a support. In some embodiments, the support comprises porous silica (e.g., kieselguhr, infusorial, diatomaceous, or siliceous earth) or alumina. The catalysts are characterized by a high nickel surface area per gram of nickel. In some embodiments, the particles of supported nickel catalyst are dispersed in a protective medium. In an exemplary embodiment, the supported nickel catalyst is provided as a 20-30 weight percent suspension in a natural oil.

Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

The present triacylglycerol stock can be produced by mixing a partially hydrogenated refined, bleached natural oil, such as a refined, bleached soybean oil which has been hydrogenated to an IV of about 60-70, with a second oil seed-derived material having a higher melting point, e.g., a fully hydrogenated palm oil. For example, this type of partially hydrogenated soybean oil can be blended with the fully hydrogenated palm oil in a ratio which ranges from about 70:30 to 90:10, and more preferably about 75:25 to 85:15. As will be recognized by one skilled in the art, these numbers are merely approximations and depend not only upon the plant material from which the triacylglycerol stock is produced but also the hydrogenation level of the triacylglycerol stock. The triacylglycerol stock produced thereby preferably has the characteristics described above and suitably has a melting point of about 50° C. to 57° C., an Iodine Value from about 40-55 and a 16:0 content from about 15 to 18 wt. %. The triacylglycerol stock can be used alone as a wax to form candles or additional wax materials can be added to the triacylglycerol stock.

At times, the triacylglycerol component of the wax can also be mixed with a minor amount of a free fatty acid component to achieve desired characteristics, such as melting point. When present, the free fatty acid is present in minimal amounts, preferably less than about 10 wt. % and more preferably no more than about 1 wt. %. The free fatty acid component is often derived from saponification of a natural-oil based material and commonly includes a mixture of two or more fatty acids. For example, the fatty acid component may suitably include palmitic acid and/or stearic acid, e.g., where at least about 90 wt. % of the fatty acid which makes up the fatty acid component is palmitic acid, stearic acid or a mixture thereof. In general, the higher the ratio of the hydrogenated oil to the fatty acid, the softer the product. A higher percentage of fatty acid generally produces a harder product. However, too high a level of a free fatty acid, such as palmitic acid, in the wax can lead to cracking or breaking.

As previously stated, the triacylglycerol stock is well suited for use as a candle wax, particularly for container candles. The triacylglycerol stock described herein not only has the melting point and hardness desirable in container candle waxes, the present triacylglycerol wax also has the proper surface adhesion characteristics so the wax does not pull away from the container when cooled. Additionally, the present triacylglycerol stock provides a consistent, even appearance when resolidified and does not exhibit undesirable mottling in the candle which results from uneven wax crystallization.

In some embodiments, the natural oil based wax compositions may also include those described in commonly assigned U.S. Pat. Nos. 6,503,285; 6,645,261; 6,770,104; 6,773,469; 6,797,020; 7,128,766; 7,192,457; 7,217,301; 7,462,205; 7,637,968; 7,833,294; 8,021,443; 8,202,329; and U.S. Patent Application 20110219667, the disclosures of which are incorporated herein by reference in their entireties.

Additives to the Wax Composition

In certain embodiments, the wax composition may comprise at least one additive selected from the group consisting of: wax-fusion enhancing additives, coloring agents, scenting agents, migration inhibitors, free fatty acids, surfactants, co-surfactants, emulsifiers, additional optimal wax ingredients, and combinations thereof. In certain embodiments, the additive(s) may comprise upwards of approximately 30 percent by weight, upwards of approximately 5 percent by weight, or upwards of approximately 0.1 percent by weight of the wax composition.

In certain embodiments, the wax composition can incorporate a wax-fusion enhancing type of additive selected from the group consisting of benzyl benzoate, dimethyl phthalate, dimethyl adipate, isobornyl acetate, cellulose acetate, glucose pentaacetate, pentaerythritol tetraacetate, trimethyl-s-trioxane, N-methylpyrrolidone, polyethylene glycols and mixtures thereof. In certain embodiments, the wax composition comprises between approximately 0.1 percent by weight and approximately 5 percent by weight of a wax-fusion enhancing type of additive.

In certain embodiments, one or more dyes or pigments (herein "coloring agents") may be added to the wax composition to provide the desired hue to the candle. In certain embodiments, the wax composition comprises between about approximately 0.001 percent by weight and approximately 2 percent by weight of the coloring agent. If a pigment is employed for the coloring agent, it is typically an organic toner in the forum of a fine powder suspended in a liquid medium, such as a mineral oil. It may be advantageous to use a pigment that is in the form of fine particles suspended in a natural oil, e.g., a vegetable oil such as palm or soybean oil. The pigment is typically a finely ground, organic toner so that the wick of a candle formed eventually from pigment-covered wax particles does not clog as the wax is burned. Pigments, even in finely ground toner forms, are generally in colloidal suspension in a carrier.

A variety of pigments and dyes suitable for candle making are listed in U.S. Pat. No. 4,614,625 the disclosure of which is herein incorporated by reference in its entirety. In certain embodiments, the carrier for use with organic dyes is an organic solvent, such as a relatively low molecular weight, aromatic hydrocarbon solvent (e.g., toluene and xylene).

In other embodiments, one or more perfumes, fragrances, essences, or other aromatic oils (herein "scenting agents") may be added to the wax composition to provide the desired odor to the wax composition. In certain embodiments, the wax composition comprises between about approximately 1 percent by weight and approximately 15 percent by weight of the scenting agent. The coloring and scenting agents generally may also include liquid carriers that vary depending upon the type of color- or scent-imparting ingredient employed. In certain embodiments, the use of liquid organic carriers with coloring and seeming agents is preferred because such carriers are compatible with petroleum-based waxes and related organic materials. As a result, such coloring and scenting agents tend to be readily absorbed into the wax composition material.

In certain embodiments, the scenting agent may be an air freshener, an insect repellent, or mixture thereof. In certain embodiments, the air freshener scenting agent is a liquid fragrance comprising one or more volatile organic compounds, including those commercially available from perfumery suppliers such as: IFF, Firmenich Inc., Takasago Inc., Belmay, Symrise Inc, Noville Inc., Quest Co., and Givaudan-Roure Corp. Most conventional fragrance materials are volatile essential oils. The fragrance can be a synthetically formed material, or a naturally derived oil such as oil of bergamot, bitter orange, lemon, mandarin, caraway, cedar leaf, clove leaf, cedar wood, geranium, lavender, orange, origanum, petitgrain, white cedar, patchouli, lavandin, neroli, rose, and the like.

In other embodiments, the scenting agent may be selected from a wide variety of chemicals such as aldehydes, ketones, esters, alcohols, terpenes, and the like. The scenting agent can be relatively simple in composition, or can be a complex mixture of natural and synthetic chemical components. A typical scented oil can comprise woody/earthy bases containing exotic constituents such as sandalwood oil, civet, patchouli oil, and the like. A scented oil can have a light floral fragrance, such as rose extract or violet extract. Scented oil also can be formulated to provide desirable fruity odors, such as lime, lemon, or orange.

In yet other embodiments, the scenting agent can comprise a synthetic type of fragrance composition either alone or in combination with natural oils such as described in U.S. Pat. Nos. 4,314,915; 4,411,829; and 4,434,306; incorporated herein by reference in their entirety. Other artificial liquid fragrances include geraniol, geranyl acetate, eugenol, isoeugenol, linalool, linalyl acetate, phenethyl alcohol, methyl ethyl ketone, methylionone, isobornyl acetate, and the like. The scenting agent can also be a liquid formulation containing an insect repellent such as citronellal, or a therapeutic agent such as eucalyptus or menthol.

In certain embodiments, a "migration inhibitor" additive may be included in the wax composition to decrease the tendency of colorants, fragrance components, and/or other components of the wax from migrating to the outer surface of a candle. In certain embodiments, the migration inhibitor is a polymerized alpha olefin. In certain embodiments, the polymerized alpha olefin has at least 10 carbon atoms. In another embodiment, the polymerized alpha olefin has between 10 and 25 carbon atoms. One suitable example of such a polymer is a hyper-branched alpha olefin polymer sold under the trade name Vybar® 103 polymer (mp 168° F. (circa 76° C.); commercially available from Baker-Petrolite, Sugarland, Texas, USA).

In certain embodiments, the inclusion of sorbitan triesters, such as sorbitan tristearate and/or sorbitan tripalmitate, and related sorbitan triesters formed from mixtures of fully hydrogenated fatty acids, and/or polysorbate triesters or monoesters such as polysorbate tristearate and/or polysorbate tripalmitate and related polysorbates formed from mixtures of fully hydrogenated fatty acids and/or polysorbate monostearate and/or polysorbate monopalmitate and related polysorbates formed from mixtures of fully hydrogenated fatty acids in the wax composition may also decrease the propensity of colorants, fragrance components, and/or other components of the wax from migrating to the candle surface. The inclusion of either of these types of migration inhibitors can also enhance the flexibility of the wax composition and decrease its chances of cracking during the cooling processes that occur in candle formation and after extinguishing the flame of a burning candle.

In certain embodiments, the wax composition may include between approximately 0.1 percent by weight and approximately 5.0 percent by weight of a migration inhibitor (such as a polymerized alpha olefin). In another embodiment, the wax composition may include between approximately 0.1 percent by weight and approximately 2.0 percent by weight of a migration inhibitor.

In another embodiment, the wax composition may include an additional optimal wax ingredient, including without limitation, creature waxes such as beeswax, lanolin, shellac wax, Chinese insect wax, and spermaceti, various types of plant waxes such as carnauba, candelila, Japan wax, ouricury wax, rice-bran wax, jojoba wax, castor wax, bayberry wax, sugar cane wax, and maize wax), and synthetic waxes such as polyethylene wax, Fischer-Tropsch wax, chlorinated naphthalene wax, chemically modified wax, substituted amide wax, montan wax, alpha olefins and polymerized alpha olefin wax. In certain embodiments, the wax composition may include upward of approximately 25 percent by weight, upward of approximately 10 percent by weight, or upward of approximately 1 percent by weight of the additional optimal wax ingredient.

In certain embodiments, the wax composition may include a surfactant. In certain embodiments, the wax composition may include upward of approximately 25 percent by weight of a surfactant, upward of approximately 1.0 percent by weight, or upward of approximately 1 percent by weight of a surfactant. A non-limiting listing of surfactants includes: polyoxyethylene sorbitan trioleate, such as Tween 85, commercially available from Acros Organics; polyoxyethylene sorbitan monooleate, such as Tween 80, commercially available from Acros Organics and Uniqema; sorbitan tristearate, such as DurTan 65, commercially available from Loders Croklann Grindsted STS 30 K commercially available from Danisco, and Tween 65 commercially available from Acros Organics and Uniqema; sorbitan monostearate, such as Tween 60 commercially available from Acros Organics and Uniqema, DurTan 60 commercially available from Loders Croklann, and Grindsted SMS, commercially available from Danisco; Polyoxyethylene sorbitan monopalmitate, such as Tween 40, commercially available from Acros Organics and Uniqema; and polyoxyethylene sorbitan monolaurate, such as Tween 20, commercially available from Acros Organics and Uniqema.

In additional embodiments, an additional surfactant (i.e., “a co-surfactant”) may be added in order to improve the microstructure (texture) and/or stability (shelf life) of emulsified wax compositions. In certain embodiments, the wax composition may include upward of approximately 5 percent by weight of a co-surfactant. In another embodiment, the wax composition may include upward of approximately 0.1 percent by weight of a co-surfactant.

In certain embodiments, the wax composition may include an emulsifier. Emulsifiers for waxes are commonly synthesized using a base-catalyzed process, after which the emulsifiers may be neutralized. In certain embodiments, the emulsifier may be neutralized by adding organic acids, inorganic acids, or combinations thereof to the emulsifier. Non-limiting examples of organic and inorganic neutralization acids include: citric acid, phosphoric acid, hydrochloric acid, nitric acid, sulfuric acid, lactic acid, oxalic acid, carboxylic acid, as well as other phosphates, nitrates, sulfates, chlorides, iodides, nitrides, and combinations thereof.

Candle Formation and Burn Rates

Burning a candle involves a process that imposes rather stringent requirements upon the candle body material in order to be able to maintain a flame, avoid surface pool ignition, and keeping the flame at a height that will not be a safety risk. When a candle is burned, the heat of the candle’s flame melts a small pool of the candle body material (base material) around the base of the exposed portion of the wick. This molten material is then drawn up through and along the wick by capillary action to fuel the flame. Typically, the candle wick is anchored in the middle of the bottom end of the container in which the natural oil based wax (as described herein) is poured. The wick may also be inserted into either the hot liquefied wax, the cool liquefied wax or into the solidified wax. Candle wicks usable in the present candles include standard wicks used for conventional candles. Such wicks can be made of braided cotton and may have a metal or paper core. Since most container candles tend to have relatively large widths, larger wicks are preferred to provide an ideal melt pool.

Generally, the candle should liquefy at or below temperatures to which the candle’s material can be raised by radiant heat from the candle flame. If too high a temperature is required to melt the body material, the flame will be starved because insufficient fuel will be drawn up through the wick, resulting in the flame being too small to maintain itself. On the other hand, if the candle’s melting temperature is too low, the wax can be drawn up the wick faster, thus causing a high flame or, in an extreme case, the entire candle body will melt, dropping the wick into a pool of molten body material, with the potential that the surface of the pool could ignite. Additionally, in order to meet the stringent requirements upon the candle body material, when molten, the material should have a relatively low viscosity to ensure that the molten material will be capable of being drawn up through the wick by capillary action. Additional desired features may place still further demands on these already stringent requirements. For example, it is generally desirable that the candle body material burn with a flame that is both luminous and smokeless, and that the odors produced by its combustion should not be unpleasant.

Candles with excellent performance properties can be produced by heating a natural oil based wax (as described herein) to a temperature above the melting point of the wax to form a hot liquefied wax, cooling the hot liquefied wax to a temperature to a pour temperature below the melting point of the wax but above the congeal point of the wax to form a cool liquefied wax, introducing the cooled liquefied wax into a designated container and subsequently cooling the wax in the container to a temperature below its congeal point, thereby solidifying the wax. Preferably, the hot liquefied wax is cooled to about 10 to 15° C. below the melting point of the wax to provide the cool liquefied wax.

As stated above, the wax can include several optional ingredients. When colorants are used they are preferably added to the hot liquefied wax due to their stability. Alternatively, the colorant can be added at almost any stage of the process, and, indeed, the wax can be previously colored wax can be used in the present method. As most fragrances are volatile, it commonly is preferable to add fragrance oil(s) to the wax at as low a temperature as possible as is practicable, such as adding the fragrance to the cool liquefied wax at its pour temperature. However, as the temperatures required to melt triacylglycerol based waxes are not as high as those required for conventional waxes, fragrance can be added earlier in the process, such as to the hot liquefied wax, and the fragrance can even be incorporated into the wax even prior to the candle forming method. Generally, this method is not well suited to wax compositions which contain migration inhibitors because the migration inhibitors tend to increase the congeal point of the wax to about the same temperature as the melting point of the wax.

The burn rate and flame height of a candle is influenced by the capillary flow rate, capillary flow volume and/or functional surface area of the wick, as further described below. The burn rate of a candle is defined as the velocity of combustion of a candle, or the amount of wax consumed by the candle wick over a fixed period of time, described in ounces/hour or grams/hour. This value is computed by weighing the initial mass of a given candle, burning the candle, re-weighing the remaining mass and dividing the difference in mass by the precise burn time. In the alternative, the burn rate of a candle may be referred to as the “rate of consumption” of a candle.

Many factors affect the burn rate of a candle, such as the type and size of the wick. The wick of a candle is instrumental in providing the desired amount of light and is also instrumental in controlling the burning speed and efficiency of the candle. The wick of a candle provides the flame of the candle with fuel from the body of the candle. Wicks are made in a variety of shapes and sizes and are made out of a variety of materials. Considerations in selecting a wick for a candle include size, shape including diameter, stiffness, fire resistance, tethering, material, and the material of the candle body. These considerations affect the speed and consistency with which the wick and candle will burn. Conventional wicks take on a tall, narrow shape similar to rope or string. Rope-like wicks are often manufactured in a cylindrical or rectangular shape and vary by diameter, density and material. Those wicks are generally plaited (i.e. flat braided), square braided, or tubular braided. Conventional wicks are placed along or near the central, vertical axis of the candle body with the candle wax surrounding the wick. In some embodiments, the wicks may be PK7 wicks from Wicks Unlimited of Pompano Beach, Florida.

Additional external factors, like the ambient temperature, the absence or presence of drafts, the velocity of the airflow and the humidity of the atmosphere, the type of material used as the fuel sources, minor components (fragrances, dyes, etc), the shape and size of the candle itself, and whether the candle is in a container or free standing can also affect the burn rate. In some embodiments, the presence of metals in a hydrogenated natural oil, such as transition-metals such as nickel, can have an effect on the burn rate of a candle.

Capillary flow rate or the rate of fuel delivery is controlled by the size of capillaries available in a given wick. The size of capillaries is the distance between materials that are creating capillaries. The material that creates capillaries is the individual fibers or filaments within a wick. The distance between, or force applied to, these fibers or filaments determines the size of the capillaries. Therefore, the size of the capillaries is primarily dependent upon the stitch/pick tightness or density of the wick. It is generally known that increasing wick density or stitch tightness will reduce the flame height or burn rate. This is due to the fact that tighter stitches reduce the size of the capillaries, thereby restricting or reducing the capillary flow rate. Conversely, reducing the wick density or stitch tightness will increase the flame height or burn rate by increasing the size of the capillaries thereby increasing the capillary flow rate. Capillary flow volume is controlled by the number of capillaries within a wick. The number of capillaries is the amount of surface area within a wick that provides for capillary action. Given the same wick size and density, fiber or filament size controls the number of capillaries or surface area available for capillary action. Thus, the smaller the fiber or filament diameter within a wick, the more capillaries and the greater the capillary flow volume and vice versa.

Functional surface area is the amount of the surface area exposed to temperatures which are sufficiently high to cause vaporization. Wick size (diameter or width) as well as surface contour, will influence the functional surface area of the wick. For example, assuming a constant capillary flow rate, increasing the wick width or diameter will increase not only the capillary flow volume but also the functional surface area and thus increase the flame height or burn rate. Furthermore, the same size and density wick with an undulated exterior surface (i.e., a surface having distinct peaks and valleys) will exhibit a greater functional surface area and, assuming a sufficient capillary flow rate, will produce a higher burn rate and flame height as compared to the same wick with a relatively smooth exterior surface contour.

The present method for producing candles is advantageous in that triacylglycerol based candles formed according to this method can provide one-pour convenience so that second, and subsequent pours of the wax are not necessarily required to fill in a depression left as the wax cools.

Candles can be produced from the triacylglycerol-based material using a number of other methods. In one common process, the natural oil-based wax is heated to a molten state. If other additives such as colorants and/or scenting agents are to be included in the candle formulation, these may be added to the molten wax or mixed with natural oil-based wax prior to heating. The molten wax is then commonly solidified around a wick. For example, the molten wax can be poured into a mold which includes a wick disposed therein. The molten wax is then cooled to solidify the wax in the shape of the mold. Depending on the type of candle being produced, the candle may be unmolded or used as a candle while still in the mold. In certain embodiments, the molten wax is then cooled on a typical industrial line to solidify the wax in the shape of the mold or container. In some embodiments, an industrial line would consist of a conveyor belt, with an automated filling system that the candles may travel on, and may also incorporate the use of fans to speed up the cooling of the candles on the line. Depending on the type of candle being produced, the candle may be unmolded or used as a candle while still in the mold. Where the candle is designed to be used in unmolded form, it may also be coated with an outer layer of higher melting point material. In some embodiments, the aforementioned cooling of the molten wax can be accomplished by passing the molten wax through a swept-surface heat exchanger, as described in U.S. Patent Application No. 2006/0236593, which is incorporated by reference in its entirety. A suitable swept-surface heat exchanger is a commercially available Votator A Unit, described in more detail in U.S. Pat. No. 3,011,896, which is incorporated by reference in its entirety.

The candle wax may be fashioned into a variety of forms, commonly ranging in size from powdered or ground wax particles approximately one-tenth of a millimeter in length or diameter to chips, flakes or other pieces of wax approximately two centimeters in length or diameter. Where designed for use in compression molding of candles, the waxy particles are generally spherical, prilled granules having an average mean diameter no greater than about one (1) millimeter.

Prilled waxy particles may be formed conventionally, by first melting a triacylglycerol-based material, in a vat or similar vessel and then spraying the molten waxy material through a nozzle into a cooling chamber. The finely dispersed liquid solidifies as it falls through the relatively cooler air in the chamber and forms the prilled granules that, to the naked eye, appear to be spheroids about the size of grains of sand. Once formed, the prilled triacylglycerol-based material can be deposited in a container and, optionally, combined with the coloring agent and/or scenting agent.

In some embodiments, the candles generated from natural oil based wax compositions as described herein, having a high triacylglycerol content from hydrogenated natural oils, may comprise nickel that can be difficult to remove, as such nickel is usually in solution or in a finely divided state. The nickel content may be as high as 50 ppm, or up to 100 ppm nickel in such hydrogenated natural oils. These residual traces of nickel often occur in the form of soap and/or as colloidal metal. For various reasons, i.e. to prevent oxidation, it is desirable for the nickel content of the hydrogenated natural oils to be low, often below 1 ppm nickel.

Also, the presence of nickel in a hydrogenated natural oil can have an effect on the burn rate of a candle. In certain embodiments, the presence of nickel may affect the coloration and/or burn performance of candles made from the wax composition described herein by causing wick clogging, irregular flames and/or flame heights, poor fragrance interactions, or combinations of these issues.

Generally, the reduction of nickel in hydrogenated natural oils has been performed through a combination of filtration and/or bleaching of the hydrogenated natural oil. In some embodiments, such filtration and/or bleaching of the hydrogenated natural oil may reduce the nickel content to below 0.5 ppm nickel. Regarding filtration, the nickel content in a hydrogenation catalyst may be reduced in the hydrogenated product using known filtration techniques. One example is using a plate and frame filter such as those commercially available from Sparkler Filters, Inc., Conroe Tex. In another example, the filtration is performed with the assistance of pressure or a vacuum. Other examples of suitable filtering means include filter paper, pressurized filter sieves, or microfiltration. Regarding bleaching, clays of high sorptive capacity and catalytic activity have been used for decades to adsorb colored pigments (e.g., carotenoids, chlorophyll) and colorless impurities (e.g., soaps, phospholipids) from edible and inedible oils, including natural oils. This bleaching process serves both cosmetic and chemical stability purposes. Thus, bleaching is used to reduce color of certain natural oils, for example, whereby very clear, almost water-white natural oils are produced that meet with consumer expectations. Bleaching also stabilizes the natural oil by removing colored and colorless impurities which tend to "destabilize" the natural oil, resulting in oils that become rancid or revert to a colored state more easily if these impurities are not removed.

In order to improve filtering performance, a filter aid may be used. A filter aid may be added to the hydrogenated natural oil directly or it may be applied to the filter, either pre- or post-bleaching. Representative examples of filtering aids include diatomaceous earth, silica, alumina, and carbon. Typically, the filtering aid is used in an amount of about 10 weight % or less, for example, about 5 weight % or less or about 1 weight % or less of the hydrogenated natural oil. In other embodiments, the hydrogenation catalyst is removed using centrifugation followed by decantation of the product.

In some cases, an additional bleaching step may be needed to further reduce the amount of nickel in the hydrogenated natural oil. In such a bleaching step, the filtered hydrogenated natural oil is mixed with an aqueous solution of an organic acid. Such acids function as scavengers which are capable of forming inactive complexes with the metal component. Such acids include phosphoric acid, citric acid, ethylene diamine tetraacetic acid (EDTA), or malic acid. Certain acids may reduce the performance of the wax composition to unacceptable levels (specifically with regards to consumption rate and size of the melt pool as well as the color of the wax and smoking times) if their concentrations are too high. Not all acids or inorganic complexes will affect candle performance in the same way. In certain embodiments, the addition of too much phosphoric acid can lead to wick brittleness and wick clogging which can result in low consumption rates and diminished size of the candle melt pool. In other embodiments, the addition of too much citric acid can lead to unacceptable smoking times, browning of the wax, and can also result in undesirable color changes to the wax over a period of months after the candles are poured. Care should be taken to control the type and concentration of acids and inorganic complexes that are added to neutralize the emulsifier used in the candle composition. Ideally, the effective concentration of acids and bases in the wax composition should be stoichiometrically equal to help avoid burn performance issues.

Several processes known in the art have been utilized to reduce the amount of nickel in hydrogenated oils, including U.S. Pat. Nos. 2,365,045; 2,602,807; 2,650,931; 2,654,766; 2,783,260; and 4,857,237; incorporated herein by reference in their entireties.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

To identify the contribution of an inorganic, transition metal complex concentration on the burn performance of the candles, experiments with wax compositions comprising an 80:20 partially hydrogenated soybean oil/fully hydrogenated palm oil blend having the same formula, but different amounts of inorganic, transition metal complexes, were designed and executed. Studies were conducted to evaluate the effect of certain transition metal levels, in particular nickel levels, as it specifically related to burn rate [rate of consumption (ROC)] of the candle as the candles were burned. The concentration of the nickel species was confirmed by inductively coupled plasma mass spectrometry and the ROC data for each wax was completed.

The wax composition with a nickel level of >0.5 ppm was selected and was confirmed by inductively coupled plasma mass spectrometry. A sample of this wax was prepared for ROC testing (and not post-filtered) while another sample of this wax was post filtered using bleaching clay B80 and held at 80° C. under vacuum for 15 minutes. The bleaching clay was then filtered using vacuum through a 5 micron filter paper. The nickel level was confirmed for this sample by inductively coupled plasma mass spectrometry and the sample was prepared for ROC testing. Both sets of candles were prepared in 4 ounce glass jars, and both jars were wicked with PK7 wicks from Wicks Unlimited, of Pompano Beach, Florida. Both candles were burned to completion in 4 hour burn rate cycles (in grams/hour). In Table 1 below, the burn rate results and nickel levels are shown.

TABLE 1

Burn rates as a function of residual inorganic complex (nickel) concentration

| | Cycle 1 | Cycle 2 | Cycle 3 | Cycle 4 | Cycle 5 | Cycle 6 | Cycle 7 | Nickel (ppm) |
|---|---|---|---|---|---|---|---|---|
| Post Filtered | 3.8 | 4.0 | 4.0 | 4.1 | 3.9 | 3.8 | 4.0 | 0.05 |
| Non-Post Filtered | 3.0 | 2.8 | 2.8 | 2.7 | 2.7 | 2.5 | 2.4 | 0.69 |

Table 1 demonstrates the effects inorganic complex concentrations (e.g., nickel) on burn performance of the natural oil based wax candle composition. The observed consumption rates for the non-post filtered compositions were significantly lower than those for the post-filtered composition, which had a nickel concentration of 0.05 ppm. As shown in FIG. 1, the post filtered composition tends to burn straight across over the seven burn cycles (labeled along the x-axis), while the non-post filtered composition tends to have a downward slope over the seven burn cycles. The rates of consumption are shown along the y-axis.

Table 2 below charts the effect of inorganic complex concentrations (e.g., nickel) on burn performance of several of the natural oil based wax candle compositions. The compositions included both post-filtered compositions and non-post filtered compositions (some of the non-post filtered compositions were an 80:20 partially hydrogenated soybean oil/fully hydrogenated palm oil blend was taken that had nickel levels of 0.5 to 0.7 ppm, and some compositions of the same blend were further processed to remove the nickel to lower than 0.5 ppm, and some down to 0.05 ppm nickel, and the burn rate for that oil blend was found as well). A correlation between the burn rate and nickel levels was found. The lower the nickel level, the higher the burn rate of the blend, until the burn rate is at the maximum for the wicks used.

TABLE 2

Burn rates (ROC) as a function of residual inorganic complex (nickel) concentration

| ROC | Nickel |
|---|---|
| 3.0 | 0.69 |
| 3.2 | 0.67 |
| 3.1 | 0.65 |
| 3.1 | 0.61 |
| 3.2 | 0.54 |
| 3.2 | 0.53 |
| 3.2 | 0.53 |
| 3.2 | 0.53 |
| 3.2 | 0.50 |
| 3.2 | 0.50 |
| 3.2 | 0.50 |
| 3.2 | 0.49 |
| 3.2 | 0.46 |
| 3.4 | 0.42 |
| 3.3 | 0.42 |
| 3.3 | 0.42 |
| 3.2 | 0.42 |
| 3.4 | 0.42 |
| 3.3 | 0.42 |
| 3.2 | 0.41 |
| 3.3 | 0.4 |
| 3.3 | 0.40 |
| 3.3 | 0.39 |
| 3.6 | 0.39 |
| 3.3 | 0.39 |
| 3.3 | 0.38 |
| 3.3 | 0.38 |
| 3.4 | 0.38 |
| 3.3 | 0.38 |
| 3.3 | 0.37 |
| 3.4 | 0.36 |
| 3.3 | 0.36 |
| 3.3 | 0.36 |
| 3.4 | 0.36 |
| 3.4 | 0.36 |
| 3.3 | 0.36 |
| 3.4 | 0.35 |
| 3.4 | 0.35 |
| 3.4 | 0.35 |
| 3.4 | 0.35 |
| 3.4 | 0.34 |
| 3.5 | 0.34 |
| 3.4 | 0.34 |
| 3.3 | 0.33 |
| 3.2 | 0.33 |
| 3.4 | 0.33 |
| 3.4 | 0.33 |
| 3.4 | 0.33 |
| 3.5 | 0.32 |
| 3.4 | 0.32 |
| 3.5 | 0.32 |
| 3.5 | 0.32 |
| 3.4 | 0.31 |
| 3.5 | 0.31 |
| 3.4 | 0.31 |
| 3.4 | 0.30 |
| 3.5 | 0.30 |
| 3.4 | 0.30 |
| 3.5 | 0.30 |
| 3.5 | 0.30 |
| 3.3 | 0.29 |
| 3.6 | 0.28 |
| 3.8 | 0.28 |
| 3.6 | 0.28 |
| 3.5 | 0.28 |
| 3.4 | 0.28 |
| 3.6 | 0.27 |
| 3.3 | 0.27 |
| 3.6 | 0.27 |
| 3.5 | 0.27 |
| 3.5 | 0.26 |
| 3.6 | 0.26 |
| 3.5 | 0.26 |
| 3.5 | 0.26 |
| 3.5 | 0.26 |
| 3.4 | 0.26 |
| 3.6 | 0.25 |
| 3.6 | 0.25 |
| 3.6 | 0.25 |
| 3.6 | 0.24 |
| 3.6 | 0.24 |
| 3.6 | 0.24 |
| 3.6 | 0.24 |
| 3.7 | 0.23 |
| 3.6 | 0.23 |
| 3.6 | 0.23 |
| 3.6 | 0.23 |
| 3.5 | 0.23 |
| 3.6 | 0.23 |
| 3.7 | 0.23 |
| 3.5 | 0.22 |
| 3.8 | 0.22 |
| 3.6 | 0.22 |
| 3.5 | 0.22 |
| 3.4 | 0.22 |
| 3.7 | 0.21 |
| 3.6 | 0.21 |
| 3.8 | 0.21 |
| 3.7 | 0.21 |
| 3.6 | 0.21 |
| 3.7 | 0.21 |
| 3.7 | 0.21 |
| 3.5 | 0.21 |
| 3.6 | 0.20 |
| 3.6 | 0.20 |
| 3.6 | 0.20 |
| 3.6 | 0.20 |
| 3.7 | 0.20 |
| 3.6 | 0.20 |
| 3.6 | 0.20 |
| 3.5 | 0.20 |
| 3.7 | 0.20 |
| 3.5 | 0.20 |
| 3.5 | 0.20 |
| 3.5 | 0.20 |
| 3.5 | 0.20 |
| 3.6 | 0.20 |
| 3.7 | 0.19 |
| 3.7 | 0.19 |
| 3.7 | 0.19 |
| 3.8 | 0.19 |
| 3.7 | 0.19 |
| 3.7 | 0.19 |
| 3.5 | 0.19 |
| 3.9 | 0.18 |
| 3.7 | 0.18 |
| 3.6 | 0.18 |

TABLE 2-continued

Burn rates (ROC) as a function of residual inorganic complex (nickel) concentration

| ROC | Nickel |
|---|---|
| 3.7 | 0.18 |
| 3.8 | 0.18 |
| 3.7 | 0.18 |
| 3.7 | 0.18 |
| 3.8 | 0.18 |
| 3.6 | 0.18 |
| 3.6 | 0.18 |
| 3.6 | 0.18 |
| 3.7 | 0.17 |
| 3.7 | 0.17 |
| 3.8 | 0.17 |
| 3.6 | 0.17 |
| 3.7 | 0.17 |
| 3.7 | 0.17 |
| 3.7 | 0.17 |
| 3.6 | 0.17 |
| 3.7 | 0.17 |
| 3.9 | 0.17 |
| 3.9 | 0.16 |
| 3.5 | 0.16 |
| 3.8 | 0.16 |
| 3.8 | 0.15 |
| 3.6 | 0.15 |
| 3.7 | 0.15 |
| 3.6 | 0.15 |
| 3.6 | 0.15 |
| 3.7 | 0.15 |
| 3.8 | 0.15 |
| 3.8 | 0.15 |
| 3.9 | 0.14 |
| 3.9 | 0.14 |
| 3.6 | 0.13 |
| 3.8 | 0.13 |
| 3.9 | 0.13 |
| 3.7 | 0.12 |
| 3.8 | 0.12 |
| 3.9 | 0.12 |
| 3.8 | 0.12 |
| 3.8 | 0.12 |
| 3.9 | 0.12 |
| 3.7 | 0.11 |
| 3.9 | 0.11 |
| 3.8 | 0.11 |
| 3.8 | 0.11 |
| 3.9 | 0.11 |
| 3.9 | 0.10 |
| 3.8 | 0.097 |
| 3.9 | 0.09 |
| 3.8 | 0.09 |
| 3.9 | 0.08 |
| 3.8 | 0.08 |
| 3.9 | 0.08 |
| 3.9 | 0.07 |
| 3.8 | 0.06 |
| 3.9 | 0.06 |
| 3.9 | 0.06 |
| 3.8 | 0.05 |
| 3.9 | 0.05 |
| 3.9 | 0.05 |
| 3.9 | 0.05 |
| 3.9 | 0.05 |

What is claimed is:

1. A natural oil-based candle wax composition comprising:

a hydrogenated oil comprising one or more transition metal-hydrogenated natural oils;

wherein the candle wax composition has a melting point of 43° C. to 57° C. and a transition metal content of less than 0.5 ppm.

2. The candle wax composition of claim 1, wherein the transitional metal is selected from the group consisting of nickel, copper, palladium, platinum, molybdenum, iron, ruthenium, osmium, rhodium, iridium, and any combinations thereof.

3. The candle wax composition of claim 1, wherein the candle wax composition has a melting point of 49° C. to 57° C.

4. The candle wax composition of claim 1, wherein the hydrogenated oil is at least 50 wt % of the candle wax composition.

5. The candle wax composition of claim 1, wherein the hydrogenated oil is at least 90 wt % of the candle wax composition.

6. The candle wax composition of claim 1, wherein the candle wax composition has a transitional metal content of 0.05 ppm to 0.5 ppm.

7. The candle wax composition of claim 1, wherein the candle wax composition has a transitional metal content of 0.05 ppm to 0.2 ppm.

8. The candle wax composition of claim 1, wherein the hydrogenated oil is one or more triacylglycerols, wherein the one or more triacylglycerols have a fatty acid composition of from 14 wt % to 25 wt % C16:0 fatty acids, from 45 wt % to 60 wt % C18:1 fatty acids, and from 20 wt % to 30 wt % C18:0 fatty acids.

9. The candle wax composition of claim 8, wherein the one or more triacylglycerols have an iodine value of from 45 to 60.

10. The candle wax composition of claim 8, wherein the one or more triacylglycerols have a fatty acid composition of from 15 wt % to 20 wt % C16:0 fatty acids, from 50 wt % to 57 wt % C18:1 fatty acids, and from 23 wt % to 27 wt % C18:0 fatty acids.

11. The candle wax composition of claim 1, wherein the natural oil comprises one or more transition metal-hydrogenated plant oils.

12. The candle wax composition of claim 1, wherein the natural oil is canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, castor oil, or a mixture thereof.

13. The candle wax composition of claim 1, wherein the natural oil is palm oil, soybean oil, or a combination thereof.

14. The candle wax composition of claim 1, wherein the candle wax composition is free of transition metal that adsorbs on to bleaching clay.

15. The candle wax composition of claim 1, wherein the candle wax composition is free of transition metal that is removable via treatment with an aqueous solution of phosphoric acid, citric acid, ethylene diamine tetraacetic acid, or malic acid.

16. The candle wax composition of claim 1, wherein the hydrogenated oil has a transitional metal content of <0.5 ppm.

17. The candle wax composition of claim 1, wherein the hydrogenated oil has less than 1 wt % free fatty acids.

18. The candle wax composition of claim 1, wherein the candle wax composition is free of nickel soap.

19. A candle comprising:

a natural oil-based candle wax composition comprising a hydrogenated oil comprising one or more transition metal-hydrogenated natural oils, wherein the candle wax composition has a melting point of 43° C. to 57° C. and a transition metal content of less than 0.5 ppm; and a wick in the natural oil-based candle wax composition.

20. A natural oil-based candle wax composition comprising:

a hydrogenated oil comprising one or more transition metal-hydrogenated plant oils;

wherein the candle wax composition has a melting point of 43° C. to 57° C. and a transition metal content of less than 0.5 ppm.

* * * * *